US011279309B2

(12) United States Patent
Kromm et al.

(10) Patent No.: US 11,279,309 B2
(45) Date of Patent: Mar. 22, 2022

(54) PROCESS FOR FORMING AN AIRBAG CHUTE ON A SEAT

(71) Applicant: Faurecia Automotive Seating, LLC, Auburn Hills, MI (US)

(72) Inventors: Dorothy Kromm, Auburn Hills, MI (US); Igor Fudym, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 215 days.

(21) Appl. No.: 16/689,161

(22) Filed: Nov. 20, 2019

(65) Prior Publication Data
US 2021/0146869 A1 May 20, 2021

(51) Int. Cl.
*B60R 21/207* (2006.01)
*B60N 2/58* (2006.01)
*B60N 2/68* (2006.01)
*B60R 21/215* (2011.01)

(52) U.S. Cl.
CPC .............. *B60R 21/207* (2013.01); *B60N 2/58* (2013.01); *B60N 2/68* (2013.01); *B60R 21/215* (2013.01); *B60N 2002/5808* (2013.01)

(58) Field of Classification Search
CPC ....... B60R 21/207; B60R 21/215; B60N 2/58; B60N 2/68
See application file for complete search history.

(56) References Cited

U.S. PATENT DOCUMENTS

| 5,588,671 A * | 12/1996 | Boumarafi ........... B60N 2/5825 |
| | | 280/728.3 |
| 5,601,332 A * | 2/1997 | Schultz ................ B60N 2/4235 |
| | | 297/216.13 |
| 5,863,063 A | 1/1999 | Harrell |
| 5,967,603 A | 10/1999 | Genders |
| 2005/0258624 A1* | 11/2005 | Abraham .............. B60R 21/207 |
| | | 280/728.3 |
| 2007/0040426 A1* | 2/2007 | Kenny ................. B60N 2/6018 |
| | | 297/229 |
| 2009/0049658 A1 | 2/2009 | Takasawa |

FOREIGN PATENT DOCUMENTS

| EP | 1023206 B1 | 8/2000 | |
| EP | 1717110 A2 * | 11/2006 | ........... B60R 21/207 |
| FR | 2889493 A1 | 2/2007 | |
| WO | 2011016123 A1 | 2/2011 | |

OTHER PUBLICATIONS

Matsuda et al., Slide Fastener, Feb. 10, 2011, EPO, WO 2011-016123 A1, Machine Translation of Description (Year: 2011).*
European Search Report for European App. No. 20208804.3 dated Feb. 1, 2021, IDFAUH19015 EP ||, 6 pages.

* cited by examiner

*Primary Examiner* — James A English
(74) *Attorney, Agent, or Firm* — Barnes & Thornburg LLP

(57) ABSTRACT

An occupant support includes a seat frame, a seat cushion unit, and an airbag system. The airbag system includes an airbag unit coupled to the seat frame and an airbag chute coupled to the seat cushion unit. The airbag chute encloses the airbag unit and retains the airbag unit to the seat frame. The airbag chute includes a first chute flap, a second chute flap, and a zipper coupling distal ends of the first and second chute together in an installed position.

20 Claims, 3 Drawing Sheets

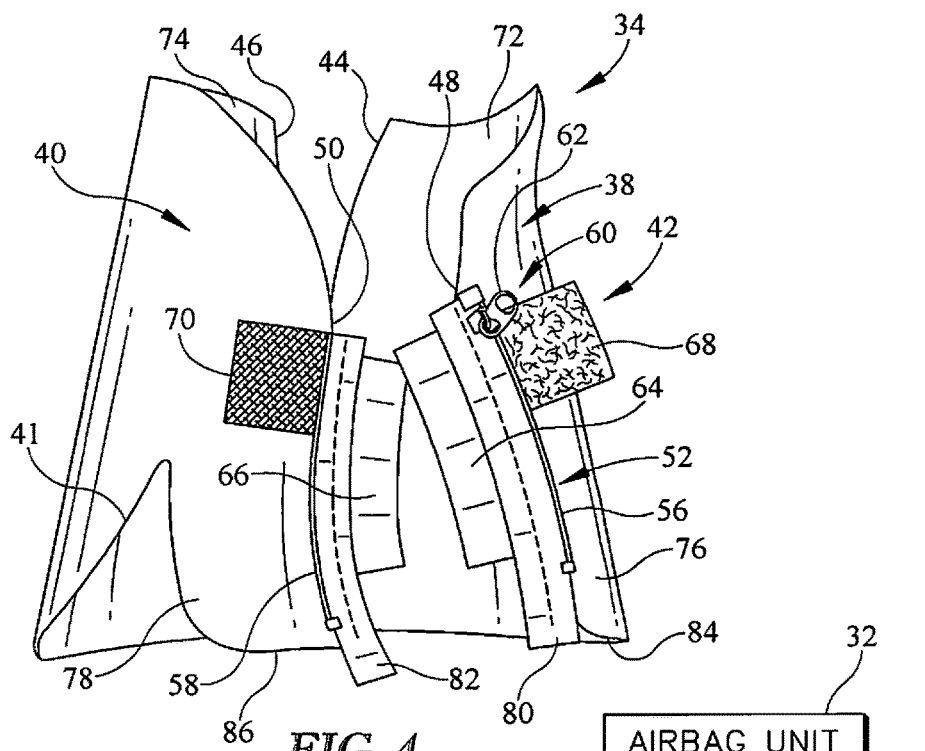
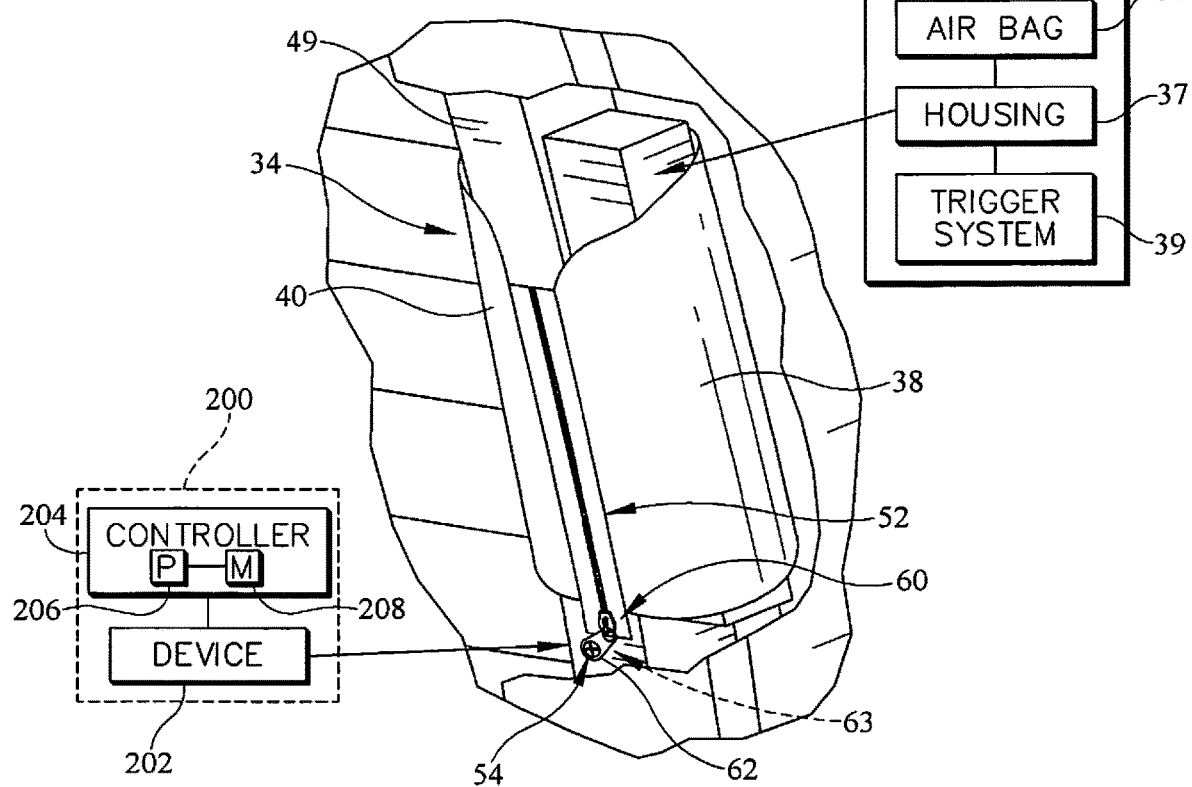
FIG. 4
FIG. 5

PROCESS FOR FORMING AN AIRBAG CHUTE ON A SEAT

BACKGROUND

The present disclosure relates to occupant supports, and particularly to occupant supports with a side airbag. More particularly, the present disclosure relates to occupant supports with a side airbag coupled to the occupant support with an airbag chute.

SUMMARY

According to the present disclosure, an occupant support includes a seat frame and a seat cushion unit. The seat frame is coupled to a floor of a vehicle and reinforces the occupant support. The seat cushion unit is shaped to fit around the seat frame and provides a comfortable outer layer that supports occupants thereon.

In the illustrative embodiment, the occupant support further includes an airbag system with an installation system that facilitates installation of the airbag system during assembly of the occupant support. The airbag system is designed with the installation system to provide behavior-shaping constraints (i.e., poka-yokes) to reduce errors in the occupant support as a result of improper assembly. The airbag system is coupled to the seat frame and the seat cushion unit and includes an airbag that is configured to change from a compact-storage configuration to a deployed configuration to protect an occupant during an impact event.

In the illustrative embodiment, the airbag system is installed concurrently during the assembly of the seat cushion unit onto the seat frame. The airbag system includes an airbag unit and an airbag chute. The airbag unit is coupled to a portion of the seat frame to anchor the airbag to the seat frame. The airbag chute wraps around the airbag unit and the portion of the seat frame to retain the airbag unit to the seat frame.

In the illustrative embodiment, the airbag chute includes a first chute flap, a second chute flap and the installation system to encourage proper installation of the airbag chute. During assembly of the seat cushion unit onto the seat frame, the first chute flap and the second chute flap change from an uninstalled configuration to an installed configuration. The installation system is coupled to the first and second chute flaps to facilitate proper instillation.

In the illustrative embodiment, the installation system includes a zipper and a zipper-head retainer. The zipper is coupled to distal ends of the first and second chute flaps and includes a first zipper strip, a second zipper strip, and a zipper head. The zipper head is slidable relative to the first and second zipper strips from an uninstalled position to an installed position. The zipper-head retainer is configured to secure a the zipper head to the seat frame when the zipper head is in the installed position to retain the airbag chute in the installed configuration.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is an exploded assembly view of the occupant support of FIG. 1 showing that the occupant support includes a seat frame and a seat cushion unit that is configured to be coupled with the seat frame to provide the seat bottom and the seat back shown in FIG. 1, and showing an airbag chute coupled to the seat cushion unit with a first chute flap and a second chute flap preparing to enclose the airbag unit around a portion of the seat frame;

FIG. 3 is a perspective view of the occupant support from FIG. 2 near an end of the assembly process showing the first chute flap and the second chute flap enclosing the airbag unit and a portion of the seat frame to anchor the airbag unit to the seat frame;

FIG. 4 is a perspective view of the airbag chute from FIGS. 2 and 3 showing that the occupant support further includes an installation system that facilitates installation of the airbag system during assembly of the occupant support;

FIG. 5 is a perspective view of a portion of the occupant support from FIG. 3 showing the airbag system fully installed and a zipper-head retainer fixing a zipper of the airbag chute to retain the zipper in an installed position.

DETAILED DESCRIPTION

Figure 1:
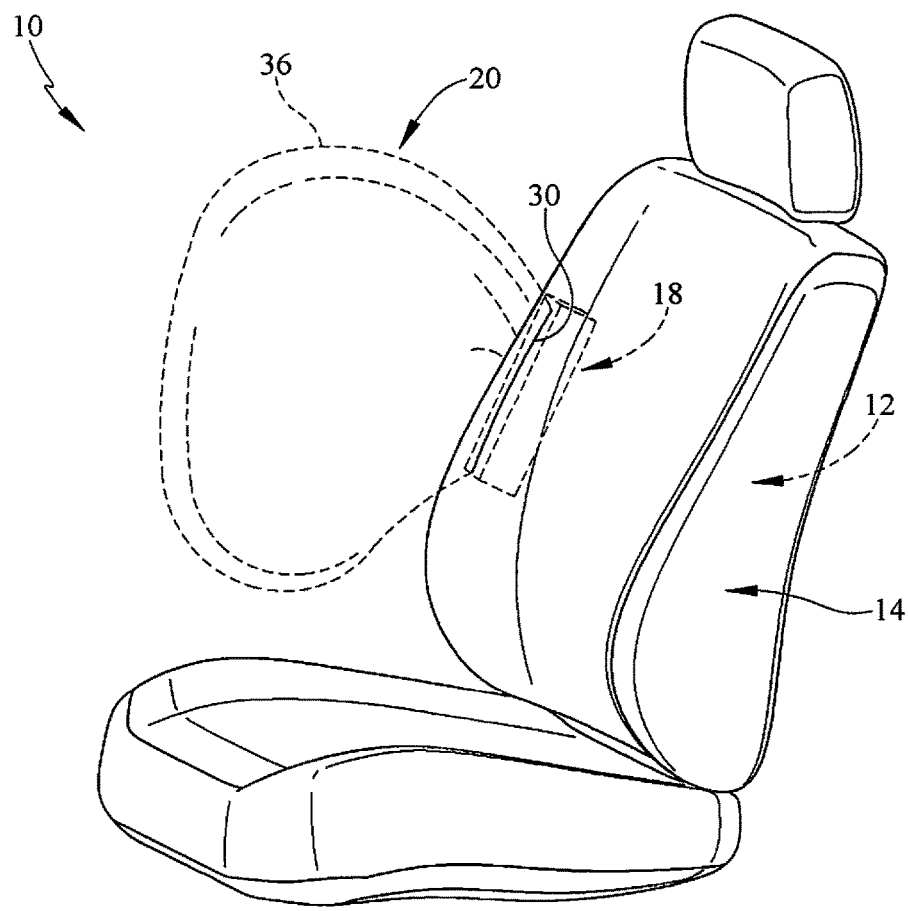
FIG. 1 is a perspective and diagrammatic view of an occupant support in accordance with the present disclosure, the occupant support includes a seat bottom, a seat back mounted to the seat bottom, and an airbag system coupled to the vehicle seat and configured to change from a compact-storage configuration, in which an airbag is deflated and confined within the seat back, to a deployed configuration, in which the airbag is deployed and protrudes through the seat back to provide protection for an occupant during an event that activates the airbag unit.
Figure 2:
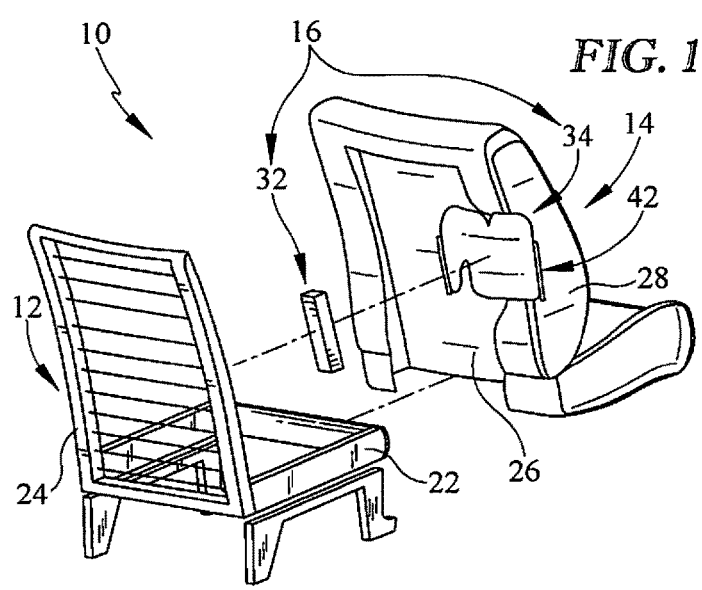
FIGS. 2 and 3 are a series of assembly views of the occupant support shown in FIG. 1 showing a portion of an assembly process of the occupant support.
Figure 3:
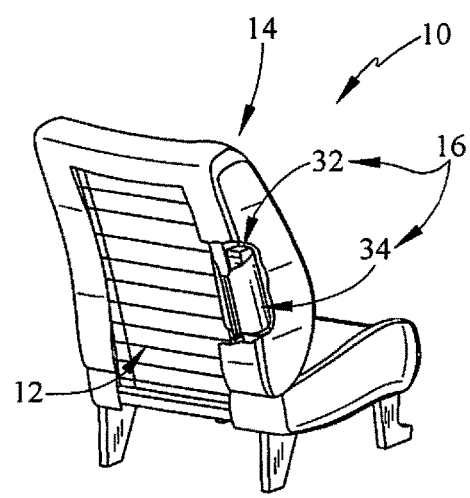

An occupant support 10 in accordance with the present disclosure is adapted for use in a vehicle as shown in FIG. 1. The occupant support 10 includes an airbag system 16 with an installation system 42 that facilitates installation of the airbag system 16 during assembly of the occupant support 10 as shown in FIGS. 2 and 3. The airbag system 16 is designed with the installation system 42 to provide behavior-shaping constraints (i.e. poka-yokes) to reduce errors in the occupant support 10 as a result of improper assembly.

The occupant support 10 includes a seat frame 12, a seat cushion unit 14, and the airbag system 16 as shown in FIGS. 1-3. The seat frame 12 is coupled to a floor of the vehicle and reinforces the occupant support 10. The seat cushion unit 14 is shaped to fit around the seat frame 12 and provides a comfortable outer layer that supports occupants thereon. The airbag system 16 is coupled to the seat frame 12 and the seat cushion unit 14 and includes an airbag 36 that is configured to change from a compact-storage configuration 18 to a deployed configuration 20 to protect an occupant during an impact event as suggested in FIG. 1.

The seat frame 12 and the seat cushion unit 14 may be manufactured separately and subsequently assembled to form the occupant support 10 as suggested in FIGS. 2 and 3. The seat frame 12 includes a seat bottom frame 22 and a seat back frame 24 coupled to the seat bottom frame 22 as shown in FIG. 2. The seat cushion unit 14 includes a foam cushion 26 and a cover 28 that are each shaped to at least partially cover the seat bottom frame 22 and the seat back frame 24 during assembly as shown in FIG. 3.

The seat cushion unit 14 provides a predetermined failure seam 30 through which the airbag 36 deploys when changing from the compact-storage configuration to the deployed configuration as suggested in FIG. 1. In the compact-storage configuration, the airbag 36 is deflated and arranged entirely beneath the cover 28. As the airbag 36 changes to the deployed configuration, the airbag 36 is inflated and rips through the predetermined failure seam 30 such that it protrudes past the cover 28. Proper installation of the airbag system 16 ensures that the airbag 36 deploys in this manner.

The airbag system 16 is installed to the seat frame 12 before the seat cushion unit 14 and includes an airbag unit 32 and an airbag chute 34 as shown in FIGS. 2 and 3. The airbag unit 32 is coupled to a portion of the seat frame 12 to anchor the airbag 36 to the seat frame 12. In the illustrative embodiment, the airbag unit 32 includes the airbag 36, a housing 37, and a trigger system 39 as shown in FIG. 5. The airbag 36 is contained in the compact-storage configuration by the housing 37. The trigger system 39 is configured to activate in response to an impact event to cause the airbag 36 to change to the deployed configuration. The airbag chute 34 wraps around the airbag unit 32 and the portion of the seat frame 12 to retain the airbag unit 32 to the seat frame 12. When the airbag chute 34 is properly installed, the seat frame 12 is able to withstand forces exerted by the airbag unit 32 as the airbag 36 is deployed. This ensures that the airbag 36 changes properly from the compact-storage configuration to the deployed configuration as suggested in FIG. 1. For example, the airbag 36 may fail to break through the predetermined failure seam 30 if the airbag chute 34 is installed improperly.

The airbag chute 34 includes a first chute flap 38, a second chute flap 40 and the installation system 42 to encourage proper installation of the airbag chute 34 as suggested in FIGS. 2 and 3 and shown in FIG. 4. The first chute flap 38 and the second chute flap 40 each have a proximal end 44, 46 coupled to the cover 28 of the seat cushion unit 14. The proximal ends 44, 46 are sewn to the cover 28 and cooperate with the cover 28 to provide the predetermined failure seam 30. During assembly of the seat cushion unit 14 onto the seat frame 12, the first chute flap 38 and the second chute flap 40 change from an uninstalled configuration, as shown in FIG. 2, to an installed configuration, as shown in FIG. 3. The first and second chute flaps 38, 40 are worked around a frame member 49 included in the seat back frame 24. Distal ends 48, 50 of the first and second chute flaps 38, 40 are then coupled together to locate the frame member 49 between the distal ends 48, 50 and the predetermined failure seam 30.

The installation system 42 is coupled to the first and second chute flaps 38, 40 to facilitate proper instillation. The installation system includes a zipper 52 and a zipper-head retainer 54 as shown in FIGS. 4 and 5. The zipper 52 is coupled to the distal ends 48, 50 of the first and second chute flaps 38, 40 and is configured to retain the distal ends 48, 50 together in the installed configuration. The zipper 52 includes a first zipper strip 56 coupled to the distal end 48 of the first chute flap 38, a second zipper strip 58 coupled to the distal end 50 of the second chute flap 40, and a zipper head 60 as shown in FIG. 4. The zipper head 60 is configured to move from an uninstalled position at a first end of the zipper strips 56, 58 to an installed position at a second end of the zipper strips 56, 58 opposite the first end. In the installed position, the first and second zipper strips 56, 58 are interlocked to retain the distal ends 48, 50 of the chute flaps 38, 40 together. The zipper-head retainer 54 is coupled to the zipper head 60 and the seat frame 12 to mount the airbag chute 34 to the seat frame 12 when the zipper head 60 is in the installed position. Once in this position, the airbag chute 34 is arranged in the installed configuration and is blocked from unintentionally changing back to the uninstalled configuration by the zipper-head retainer 54.

In the illustrative embodiment, the zipper head 60 is formed to include an aperture 62 as shown in FIGS. 4 and 5. The zipper-head retainer 54 is illustratively embodied as a fastener, such as a screw, and extends through the aperture 62 and into a corresponding opening formed in the seat frame 12. The zipper strips 56, 58 are sized selectively to have a length that aligns the aperture 62 with the corresponding aperture 63 formed in the seat frame 12 when the zipper head 60 is in the installed position. In some embodiments, the zipper-head retainer 54 may be have a different structure such as a pin or a hook, for example. In other embodiments, the zipper head 60 itself may be used as the zipper-head retainer 54.

The installation system 42 further includes a pair of assembly tabs 64, 66, and a pair of retainer tabs 68, 70 as shown in FIG. 4. The assembly tabs 64, 66 and the retainer tabs 68, 70 are sized and positioned for use by a person installing the airbag system 16 to facilitate proper installation of the airbag chute 34. A first assembly tab 64 is coupled to the first chute flap 38 and a second assembly tab 66 coupled to the second chute flap 40. Likewise, a first retainer tab 68 is coupled to the first chute flap 38 and a second retainer tab 70 is coupled to the second chute flap 40.

The first and second assembly tabs 64, 66 are positioned on the airbag chute 34 to induce assembly behaviors that reduce the likelihood of the airbag chute 34 being damaged during installation. The first assembly tab 64 is coupled to an inner surface 72 of the first chute flap 38 adjacent to the distal end 48. The first assembly tab 64 extends beyond the distal end 48 of the first chute flap 38. In the illustrative embodiment, the first assembly tab 64 is sewn to the first chute flap 38 adjacent to the first zipper strip 56. The second assembly tab 66 is coupled to an inner surface 74 of the second chute flap 40 adjacent to the distal end 50. The second assembly tab 66 extends beyond the distal end 50 of the second chute flap 40. The second assembly tab 66 is sewn to the second chute flap 40 adjacent to the second zipper strip 58. These positions and shapes provide a visible area for a person installing the airbag chute 34 to grasp during assembly. The person may use the assembly tabs 64, 66 to pull each chute flap 38, 40 around the seat frame 12 without pulling, and possibly ripping, the chutes 38, 40 or the zipper 52 directly.

The first and second retainer tabs 68, 70 are positioned on the airbag chutes 38, 40 to induce an assembly behavior that reduces a probability of improper or incomplete installation of the zipper 52. The first retainer tab 68 is coupled to an outer surface 76 of the first chute flap 38 adjacent to the first zipper strip 56. The second retainer tab 70 is coupled to an outer surface 78 of the second chute flap 40 adjacent to the second zipper strip 58. In the illustrative embodiment, the first retainer tab 68 is a female VELCRO™ tab and the second retainer tab 70 is a male VELCRO™ tab. The first and second chute flaps 38, 40 may be temporarily coupled together by the retainer tabs 68, 70 to facilitate changing of the zipper head 60 from the uninstalled position to the installed position.

The installation system 42 further includes a first zipper-strip extension 80 coupled to the first zipper strip 56 and a second zipper-strip extension 82 coupled to the second zipper strip. The first and second zipper-strip extensions 80, 82 extend beyond lower edges 84, 86 of the first chute flap 38 and the second chute flap 40. The zipper-strip extensions 80, 82 induce an assembly behavior that reduces a probability of improper or incomplete installation of the zipper 52. Since the airbag chute 34 is designed to have a tight fit on the airbag unit 32 and the seat frame 12, the first and second zipper-strip extensions 80, 82 provide a visible area for a person installing the airbag chute 34 to grasp. The first and second zipper-strip extensions 80, 82 may be pulled after the zipper head 60 is in the installed position to move the zipper head 60 toward the aperture 63 formed in the seat frame 12 so that the zipper-head retainer 54 can be secured to the seat frame 12.

Figure 6:
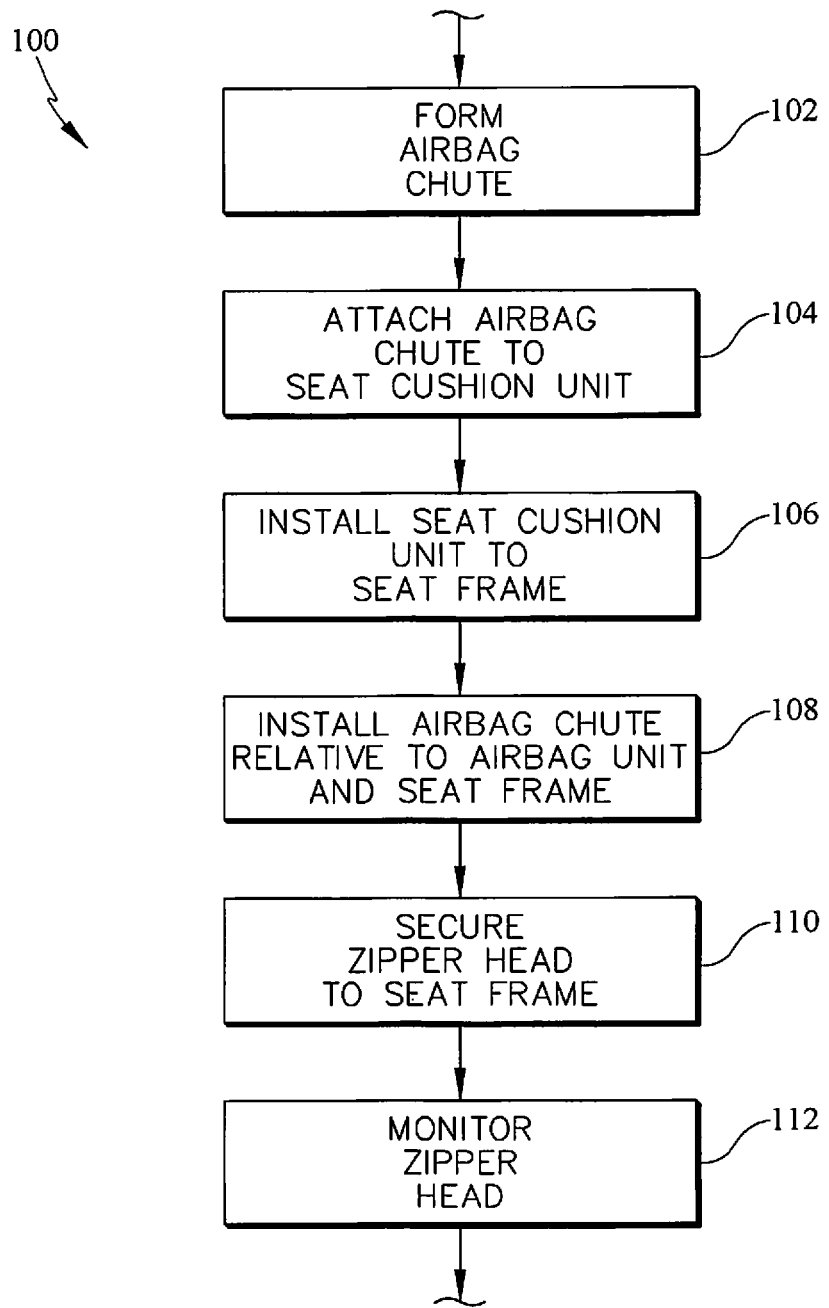
FIG. 6 is a flow chart showing a process of installing the airbag system using the installation system during assembly of the occupant support.

A method 100 of installing and using the airbag system 16 is shown as a flowchart in FIG. 6. The flow chart has been simplified in FIG. 6 and a series of steps and sub-steps are described below. The method 100 may begin with a step 102 of forming the airbag chute 34. In the illustrative embodiment, each of the chute flaps 38, 40 are formed from a flexible material. The step 102 of forming the airbag chute 34 may include sizing the airbag chute 34 relative to the particular seat frame 12 to which it is attached. For example, the airbag chute 34 may be formed to include one or more structure accommodation features 41 that correspond with a structure on the seat frame 12. The structure accommodation features 41 provide areas for the airbag chute 34 to fit around structures in the seat frame 12 without engaging and bunching up against the structures. Additionally, the airbag chute 34 or the zipper 52 may be formed to have a predetermined length so that the zipper head 60 is aligned with a pre-established aperture 63 in the seat frame 12 when the zipper head 60 is in the installed position.

The method 100 continues with a step 104 of attaching each of the flaps 38, 40 to the cover 28 of the seat cushion unit 14. In the illustrative embodiment, the proximal ends 44, 46 of each chute flap 38, 40 are sewn to the inside of the cover 28 such that the chute flaps 38, 40 extend from the cover 28 toward the seat frame 12. The chute flaps 38, 40 are sewn to the cover 28 adjacent to the predetermined failure seam 30.

The method continues with a step 106 of installing the seat cushion unit 14 to the seat frame 12. The seat cushion unit 14 is fitted around the seat frame 12 during step 106 and may be secured to the seat frame 12 with a plurality of clips or fasteners. Simultaneous with the step 106 of installing the seat cushion unit 14 to the seat frame 12, the method also continuous with a step 108 of installing the airbag chute 34.

As described above, the airbag chute 34 is designed with the installation system 42 to facilitate proper installation of the airbag chute 34 during step 108. The assembly tabs 64, 66 are grasped during step 108 to pull and work each chute flap 38, 40 around airbag unit 32 and one or more frame members 48 to anchor the airbag unit 32 to the seat frame 12. The retainer tabs 68, 70 then temporarily couple distal ends 48, 50 of the chute flaps 38, 40 to one another to facilitate changing the zipper head 60 from the uninstalled position to the installed position. With the zipper head 60 in the installed position, the zipper-strip extensions 80, 82 are grasped pulled to move the zipper head toward the aperture 63 in the seat frame 12.

The method 100 continues with a step 110 of securing the zipper head 60 to the seat frame in the installed position with the zipper-head retainer 54. In the illustrative embodiment, the zipper-head retainer 54 is a fastener and extends through the apertures 62, 63 formed in the zipper head 60 and the seat frame 12. The method 100 further includes a step 112 of monitoring installation of the zipper-head retainer 54 to ensure proper installation. This step 112 may be performed simultaneously with the step 110 of securing the zipper head to the seat frame 12 or may be performed after step 110.

In the illustrative embodiment, the step 112 of monitoring installation of the zipper-head retainer 54 includes monitoring the zipper-head retainer 54 and the zipper head 60 with a system 200. The system 200 includes a device 202 and a controller 204 with a microprocessor 206 and a memory storage device 208 as shown in FIG. 5. The device in the illustrative embodiment is a camera 202. The camera 202 faces toward the zipper head 60 and the zipper-head retainer 54 and captures image data during step 110. The controller 204 is coupled to the camera 202 and receives the image data. The controller 204 is configured to analyze the image data to determine if the zipper-head retainer 54 has been properly installed. In one embodiment, the memory storage device 208 is pre-programmed with instructions that when executed by the microprocessor, compare a set of pre-established criteria to the image data to determine if the zipper-head retainer 54 has been properly installed. The set of criteria may include pre-established shapes or positions of components that correspond to an acceptable assembly.

In another embodiment, the device in the system 200 is a tool 202 that is used to install the zipper-head retainer 54. The tool 202 is coupled to the controller 204 and provides data associated with the installation of the zipper-head retainer 54. For example, the tool 202 may provide torque level data to the controller 204. The controller 204 may then determines whether the zipper-head retainer 54 was installed with an acceptable torque level. The acceptable torque level may be compared to a predetermined threshold torque level range.

If the controller 204 determines that the zipper-head retainer has not been installed properly, the controller 204 may output a notification to that effect. The notification may include a visible or audible message that signals to persons assembling the occupant support that improper installation should be addressed.

The following numbered clauses include embodiments that are contemplated and non-limiting:

Clause 1. A method of using an airbag system in an occupant support, the method comprising providing a seat frame and a seat cushion unit, the seat cushion unit arranged to at least partially surround the seat frame.

Clause 2. The method of clause 1, or any other clause or combination of clauses, further including coupling the airbag system to the seat frame with an airbag chute, the airbag chute including a first chute flap, a second chute flap, and a zipper with a first zipper strip coupled to a distal end of the first chute flap, a second zipper strip coupled to a distal end of the second chute flap, and a zipper head slidable between an uninstalled position and an installed position.

Clause 3. The method of clause 2, or any other clause or combination of clauses, further including coupling the first chute flap to the second chute flap with the zipper.

Clause 4. The method of clause 3, or any other clause or combination of clauses, further including retaining the zipper head to the seat frame with a zipper-head retainer that extends into an aperture formed in the seat back to secure the airbag chute to the seat frame when the zipper head is in the installed position.

Clause 5. The method of clause 4, or any other clause or combination of clauses, further including monitoring installation of the zipper-head retainer to determine that the fastener was installed properly.

Clause 6. The method of clause 5, or any other clause or combination of clauses, wherein the zipper-head retainer is monitored with a camera.

Clause 7. The method of clause 5, or any other clause or combination of clauses, wherein the zipper-head retainer is monitored with a tool that measures a torque level of the zipper-head retainer and the step of monitoring installation of the zipper-head retainer includes determining whether the zipper-head retainer was installed with a torque level that is between a predetermined threshold torque level range.

Clause 8. The method of clause 4, or any other clause or combination of clauses, wherein the airbag chute further includes a first assembly tab coupled to the first chute flap and a second assembly tab coupled to the second chute flap, and the step of coupling the airbag system to the seat frame includes pulling the first and second chute flaps around the seat frame with the first and second assembly tabs.

Clause 9. The method of clause 8, or any other clause or combination of clauses, wherein the airbag chute further includes a first retainer tab coupled to the first chute flap and a second retainer tab coupled to the second chute flap, and the step of coupling the airbag system to the seat frame includes securing the first retainer tab to the second retainer tab prior to the step of coupling the first chute flap to the second chute flap.

Clause 10. The method of clause 8, or any other clause or combination of clauses, wherein the airbag unit comprises an airbag that is configured to change from a compact-storage configuration in which the airbag is deflated and confined by the airbag chute and a deployed configuration in which the airbag expands and protrudes past the seat cushion unit and the method further comprises retaining the airbag chute to the seat frame as the airbag changes from the compact-storage configuration to the deployed configuration.

Clause 11. An occupant support includes a seat frame including a seat frame back and a seat frame bottom.

Clause 12. The occupant support of clause 11, or any other clause or combination of clauses, further including a seat cushion unit adapted to be coupled to the seat frame to cover the seat frame.

Clause 13. The occupant support of clause 12, or any other clause or combination of clauses, further including an airbag system including an airbag unit coupled to the seat frame and an airbag chute configured to change from an uninstalled configuration to an installed configuration in which the airbag chute encloses the airbag unit to retain the airbag unit to the seat frame.

Clause 14. The occupant support of clause 13, or any other clause or combination of clauses, wherein the airbag chute includes a first chute flap, a second chute flap, and an installation system configured to encourage proper assembly of the airbag chute, the installation system including (i) a zipper with a first zipper strip coupled to a distal end of the first chute flap, a second zipper strip coupled to a distal end of the second chute flap, and a zipper head that is formed to include an aperture and is configured to move from an uninstalled position at a first end of the first zipper strip and the first and second zipper strips are separated to an installed position at a second end of the first zipper strip opposite the first end and the first and second zipper strips are coupled together, and (ii) a zipper-head retainer coupled to the zipper head and the seat frame to mount the airbag chute the seat frame when the zipper head is in the installed position to arrange the airbag chute in the installed configuration.

Clause 15. The occupant support of clause 14, or any other clause or combination of clauses, wherein the installation system further includes a first assembly tab coupled to the first chute flap and a second assembly tab coupled to the second chute flap, the first and second assembly tabs being configured to facilitate assembly of the airbag chute around the airbag unit.

Clause 16. The occupant support of clause 15, or any other clause or combination of clauses, wherein the first assembly tab is coupled to an inner surface of the first chute flap adjacent to the distal end of the first chute flap and the second assembly tab is coupled to an inner surface of the second chute flap adjacent to the distal end of the second chute flap.

Clause 17. The occupant support of clause 16, or any other clause or combination of clauses, wherein the first assembly tab extends beyond the distal end of the first chute flap and the second assembly tab extend beyond the distal end of the second chute flap.

Clause 18. The occupant support of clause 17, or any other clause or combination of clauses, wherein the first assembly tab is sewn to the first chute flap adjacent to the first zipper strip and the second assembly tab is sewn to the second chute flap adjacent to the second zipper strip.

Clause 19. The occupant support of clause 18, or any other clause or combination of clauses, wherein the installation system further includes a first retainer tab coupled to the first chute flap and a second retainer tab coupled to the second chute flap.

Clause 20. The occupant support of clause 19, or any other clause or combination of clauses, wherein the first retainer tab is coupled to an outer surface of the first chute flap adjacent to the first zipper strip and the second retainer tab is coupled to an outer surface of the second chute flap adjacent to the second zipper strip.

Clause 21. The occupant support of clause 20, or any other clause or combination of clauses, wherein the installation system further includes a first zipper strip extension coupled to the first zipper strip and a second zipper strip extension coupled to the second zipper strip, the first and second zipper strip extensions extending beyond lower edges of the first chute flap and the second chute flap.

Clause 22. An occupant support includes a seat frame, a seat cushion unit coupled to the seat frame, and an airbag system.

Clause 23. The occupant support of clause 22, or any other clause or combination of clauses, wherein the airbag system including an airbag unit coupled to the seat frame and an airbag chute configured to change from an uninstalled configuration to an installed configuration in which the airbag chute encloses the airbag unit and retains the airbag unit to the seat frame, the airbag chute including a first chute flap, a second chute flap, and an installation system including a zipper and a zipper-head retainer, the zipper configured to change from an uninstalled position in which a distal end of the first chute flap is separated from a distal end of the second chute flap and an installed position in which the distal ends of the first and second chute flaps are coupled together and retained to the seat frame by the zipper-head retainer, Clause 24. The occupant support of clause 23, or any other clause or combination of clauses, wherein the installation system is configured to provide means for facilitating installation of the airbag chute to the seat frame during assembly of the vehicle seat and retaining the zipper in the installed position to block the zipper from unintentionally changing to the uninstalled position once the airbag system is in the installed configuration so that the airbag unit does not de-couple the distal ends of the first chute flap and the second chute flap during an event that activates the airbag unit.

Clause 25. The occupant support of clause 24, or any other clause or combination of clauses, wherein the installation system further includes a first assembly tab coupled to the first chute flap and a second assembly tab coupled to the second chute flap.

Clause 26. The occupant support of clause 25, or any other clause or combination of clauses, wherein the installation system further includes a first retainer tab coupled to the first chute flap and a second retainer tab coupled to the second chute flap.

Clause 27. The occupant support of clause 26, or any other clause or combination of clauses, wherein the zipper includes a first zipper strip coupled to the distal end of the first chute flap, a second zipper strip coupled to the distal end of the second chute flap, and a zipper head that is formed to include an aperture, and the zipper head retainer extends through the aperture formed in the zipper head and is coupled to the seat frame to fix the zipper in the installed position.

Clause 28. The occupant support of clause 27, or any other clause or combination of clauses, wherein the installation system further includes a first zipper strip extension coupled to the first zipper strip and a second zipper strip extension coupled to the second zipper strip, the first and second zipper strip extensions extending beyond lower edges of the first chute flap and the second chute flap.

The invention claimed is:

1. A method of using an airbag system in an occupant support, the method comprising
    providing a seat frame and a seat cushion unit, the seat cushion unit arranged to at least partially surround the seat frame,
    coupling the airbag system to the seat frame with an airbag chute, the airbag chute including a first chute flap, a second chute flap, and a zipper with a first zipper strip coupled to a distal end of the first chute flap, a second zipper strip coupled to a distal end of the second chute flap, and a zipper head slidable between an uninstalled position and an installed position,
    coupling the first chute flap to the second chute flap with the zipper, and
    retaining the zipper head to the seat frame with a zipper-head retainer that extends into an aperture formed in the seat frame to secure the airbag chute to the seat frame when the zipper head is in the installed position.

2. The method of claim 1, further comprising a step of monitoring installation of the zipper-head retainer to determine that the zipper-head retainer was installed properly.

3. The method of claim 2, wherein the zipper-head retainer is monitored with a camera.

4. The method of claim 2, wherein the zipper-head retainer is monitored with a tool that measures a torque level of the zipper-head retainer and the step of monitoring installation of the zipper-head retainer includes determining whether the zipper-head retainer was installed with a torque level that is between a predetermined threshold torque level range.

5. The method of claim 1, wherein the airbag chute further includes a first assembly tab coupled to the first chute flap and a second assembly tab coupled to the second chute flap, and the step of coupling the airbag system to the seat frame includes pulling the first and second chute flaps around the seat frame with the first and second assembly tabs.

6. The method of claim 5, wherein the airbag chute further includes a first retainer tab coupled to the first chute flap and a second retainer tab coupled to the second chute flap, and the step of coupling the airbag system to the seat frame includes securing the first retainer tab to the second retainer tab prior to the step of coupling the first chute flap to the second chute flap.

7. The method of claim 1, wherein the airbag unit comprises an airbag that is configured to change from a compact-storage configuration in which the airbag is deflated and confined by the airbag chute and a deployed configuration in which the airbag expands and protrudes past the seat cushion unit and the method further comprises retaining the airbag chute to the seat frame as the airbag changes from the compact-storage configuration to the deployed configuration.

8. An occupant support comprising
    a seat frame including a seat frame back and a seat frame bottom,
    a seat cushion unit adapted to be coupled to the seat frame to cover the seat frame, and
    an airbag system including an airbag unit coupled to the seat frame and an airbag chute configured to change from an uninstalled configuration to an installed configuration in which the airbag chute encloses the airbag unit to retain the airbag unit to the seat frame,
    wherein the airbag chute includes a first chute flap, a second chute flap, and an installation system configured to encourage proper assembly of the airbag chute, the installation system including (i) a zipper with a first zipper strip coupled to a distal end of the first chute flap, a second zipper strip coupled to a distal end of the second chute flap, and a zipper head that is formed to include an aperture and is configured to move from an uninstalled position at a first end of the first zipper strip and the first and second zipper strips are separated to an installed position at a second end of the first zipper strip opposite the first end and the first and second zipper strips are coupled together, and (ii) a zipper-head retainer coupled to the zipper head and the seat frame to mount the airbag chute to the seat frame when the zipper head is in the installed position to arrange the airbag chute in the installed configuration.

9. The occupant support of claim 8, wherein the installation system further includes a first assembly tab coupled to the first chute flap and a second assembly tab coupled to the second chute flap, the first and second assembly tabs being configured to facilitate assembly of the airbag chute around the airbag unit.

10. The occupant support of claim 9, wherein the first assembly tab is coupled to an inner surface of the first chute flap adjacent to the distal end of the first chute flap and the second assembly tab is coupled to an inner surface of the second chute flap adjacent to the distal end of the second chute flap.

11. The occupant support of claim 10, wherein the first assembly tab extends beyond the distal end of the first chute flap and the second assembly tab extends beyond the distal end of the second chute flap.

12. The occupant support of claim 10, wherein the first assembly tab is sewn to the first chute flap adjacent to the first zipper strip and the second assembly tab is sewn to the second chute flap adjacent to the second zipper strip.

13. The occupant support system of claim 9, wherein the installation system further includes a first retainer tab coupled to the first chute flap and a second retainer tab coupled to the second chute flap.

14. The occupant support system of claim 13, wherein the first retainer tab is coupled to an outer surface of the first chute flap adjacent to the first zipper strip and the second retainer tab is coupled to an outer surface of the second chute flap adjacent to the second zipper strip.

15. The occupant support of claim 8, wherein the installation system further includes a first zipper strip extension coupled to the first zipper strip and a second zipper strip extension coupled to the second zipper strip, the first and second zipper strip extensions extending beyond lower edges of the first chute flap and the second chute flap.

16. An occupant support comprising
a seat frame,
a seat cushion unit coupled to the seat frame, and
an airbag system, the airbag system including an airbag unit coupled to the seat frame and an airbag chute configured to change from an uninstalled configuration to an installed configuration in which the airbag chute encloses the airbag unit and retains the airbag unit to the seat frame, the airbag chute including a first chute flap, a second chute flap, and an installation system including a zipper and a zipper-head retainer, the zipper configured to change from an uninstalled position in which a distal end of the first chute flap is separated from a distal end of the second chute flap and an installed position in which the distal ends of the first and second chute flaps are coupled together and the zipper is fixed to the seat frame by the zipper-head retainer in a fixed positon relative to the seat frame,
wherein the installation system is configured to facilitate installation of the airbag chute to the seat frame during assembly of the occupant support and is configured to retain the zipper in the installed position to block the zipper from unintentionally changing to the uninstalled position once the airbag system is in the installed configuration so that the airbag unit does not de-couple the distal ends of the first chute flap and the second chute flap during an event that activates the airbag unit.

17. The occupant support of claim 16, wherein the installation system further includes a first assembly tab coupled to the first chute flap and a second assembly tab coupled to the second chute flap.

18. The occupant support of claim 17, wherein the installation system further includes a first retainer tab coupled to the first chute flap and a second retainer tab coupled to the second chute flap.

19. The occupant support of claim 16, wherein the zipper includes a first zipper strip coupled to the distal end of the first chute flap, a second zipper strip coupled to the distal end of the second chute flap, and a zipper head that is formed to include an aperture, and the zipper head retainer extends through the aperture formed in the zipper head and is coupled to the seat frame to fix the zipper in the installed position.

20. The occupant support of claim 19, wherein the installation system further includes a first zipper strip extension coupled to the first zipper strip and a second zipper strip extension coupled to the second zipper strip, the first and second zipper strip extensions extending beyond lower edges of the first chute flap and the second chute flap.

* * * * *